Sept. 30, 1958 F. G. MASON 2,853,882

FINE-TUNING MECHANISM

Filed Sept. 26, 1957

INVENTOR.
Francis G. Mason
BY
Ooms, McDougall, Williams & Hersh
Attorneys

United States Patent Office 2,853,882

Patented Sept. 30, 1958

2,853,882

FINE-TUNING MECHANISM

Francis G. Mason, Westport, Conn., assignor to Aladdin Industries, Incorporated, Nashville, Tenn., a corporation of Illinois Application September 26, 1957, Serial No. 686,427

7 Claims. (Cl. 74—10.54)

This invention relates to a mechanism for mechanically affording fine or precise tuning in adjustable apparatus which is tuned by rotation of a shaft. Typical of such apparatus is a modern television tuner. More particularly, my invention relates to an apparatus which can be employed with a dual or tandem television tuner, having V. H. F. and U. H. F. sections, to effect fine tuning of both the V. H. F. and U. H. F. circuits with a single manual control knob.

Hence it is an object of my invention to provide a simple means for making fine adjustments of a shaft-actuated tuner, such fine tuning being manually operable by means of a second shaft, mounted concentrically with respect to the main tuning shaft.

In the achievement of the aforementioned object, my invention has as a secondary object the achievement of accurate fine tuning by apparatus of great simplicity and low cost.

A further, and more specific, object of the invention is to provide a convenient and inexpensive fine-tuning mechanism for use with tandem television tuners having separate V. H. F. and U. H. F. sections.

Other objects and advantages of the invention will appear from the following description of a typical embodiment thereof.

Figure 1:
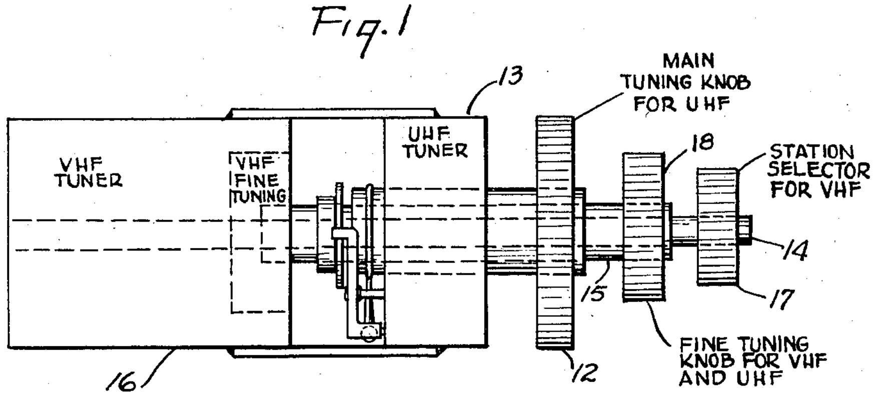
Figures 2, 3:
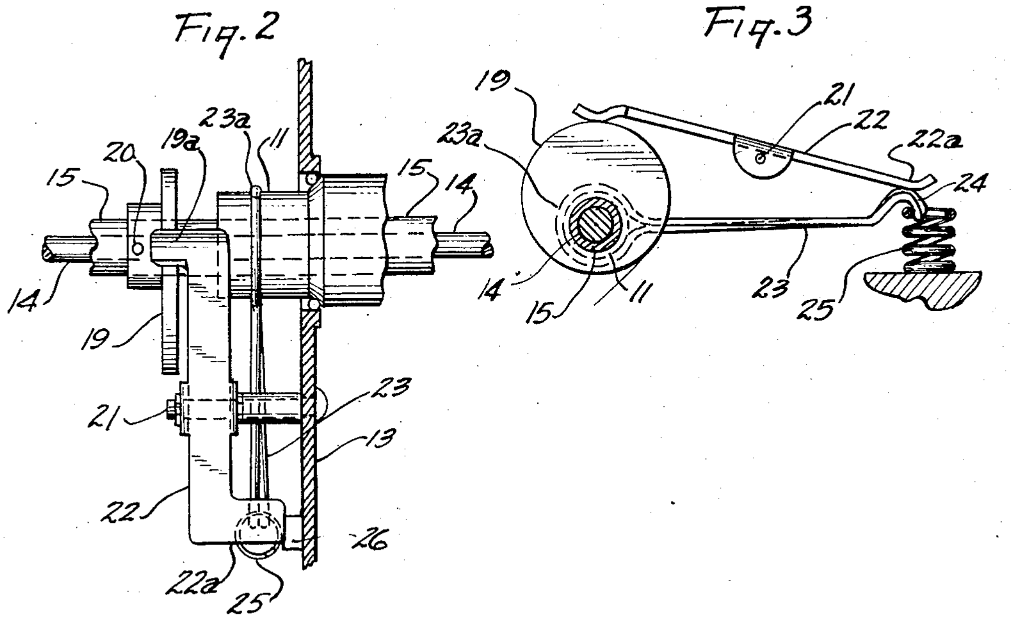
Figure 4:
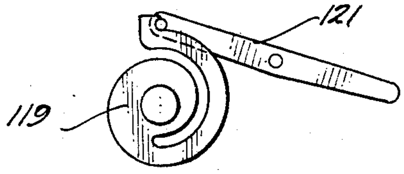

In the appended drawing, Figure 1 is a diagrammatic illustration of a television tuner arrangement employing my invention for effecting fine tuning, with a single knob, of both V. H. F. and U. H. F. circuits. In order to bring out the relative relationships of the various shafts involved, the diameters of the shafts in Fig. 1 have been intentionally exaggerated. Fig. 2 is a side elevation view, partly in section, showing the fine-tuning mechanism, generally depicted in Fig. 1, which is the heart of my invention. Fig. 3 is a diagrammatic fragmentary sketch showing certain portions of my fine-tuning mechanism and illustrating the manner in which they cooperate. Fig. 4 is a fragmentary diagrammatic view showing an alternative type of cam mechanism which may be employed in a fine-tuning mechanism embodying my invention.

As heretofore pointed out, my invention is particularly useful in television receiving apparatus of the type having separate tuners for covering the V. H. F. channels and the U. H. F. channels. Such receivers normally have the tuners for the respective frequency ranges mounted in front of one another and tuned by means of concentric shafts. In some cases, the tuning of the V. H. F. and U. H. F. circuits is accomplished by means of a single knob, rotation of the knob through a part of its range being operative to actuate the V. H. F. tuner, while continued rotation of the knob beyond a certain point switches in the other tuner and causes it to be adjusted in frequency. In other cases, concentric shafts are employed for tuning of the respective circuits in the U. H. F. and V. H. F. sections of the tuner.

Whichever of the foregoing modes of operation be employed in a particular case, it is decidedly advantageous to provide a single fine-tuning control which will operate on both frequency ranges.

For illustrative purposes, I have shown in Fig. 1 an arrangement in which V. H. F. and U. H. F. tuners are mounted in tandem and in which separate main tuning knobs are provided for the U. H. F. and V. H. F. ranges.

In Fig. 1 the tuning mechanism comprises three shafts arranged concentrically. The outermost shaft 11 is controlled by manual knob 12 and is employed as a main tuning knob for the U. H. F. tuner 13. Shaft 11 passes entirely through the housing of tuner 13, projecting a short distance in back thereof, as is shown more clearly in Fig. 2.

The innermost shaft 14 and the intermediate shaft 15 both pass entirely through the outer shaft 11 and extend therebeyond into the housing of the V. H. F. tuner 16, shown diagrammatically in Fig. 1. The coarse tuning of the V. H. F. tuner is accomplished by shaft 14 under the control of manual knob 17, and the fine tuning of the V. H. F. tuner is achieved by means of shaft 15 under the control of manual knob 18.

The details of the structure by means of which coarse and fine tuning of the V. H. F. tuner is accomplished are not material to the present invention and need not be described herein, since any of the conventional tuning methods may be used. Similarly, the electrical and mechanical details of the apparatus by means of which the U. H. F. tuner 13 is tuned by means of the shaft 11 need not be described herein, since they also may be conventional. That is, rotation of shaft 11 may result in adjustment of a variable condenser, in tuning of a resonant cavity, or in any other suitable change in the circuit elements which make up the U. H. F. tuner. As will be presently explained, the fine-tuning mechanism which is the central feature of the present invention is mechanical in character and results in slow, finely controlled movement of the shaft 11 responsively to rotation of the fine-tuning shaft 15 by means of manual knob 18.

In the arrangement of Fig. 1, fine tuning of both the V. H. F. and U. H. F. tuners may be achieved by rotation of manual knob 18. V. H. F. fine tuning, as previously mentioned, may be accomplished inside the housing 16 of the V. H. F. tuner in any conventional manner. I shall now explain the manner in which I achieve fine tuning of the U. H. F. tuner by rotation of that same shaft 15.

On shaft 15 beyond the rearward end of shaft 11, I provide a cam 19, rigidly secured to shaft 15 in any suitable manner, as by means of key 20. On the back face of the housing of the U. H. F. tuner 13, I provide a pivot element 21, on which is pivotally mounted a cam follower 22. Cam follower 22 is pivoted on the pivot 21 intermediate its ends. The end adjacent the cam 19 is suitably modified at **19*a* to bear against the surface of cam 19, while the other end of follower 22 presses against a spring lever 23**.

Lever 23 is made of spring wire looped once around the shaft 11, the loop **23*a* being carried in an annular recess formed in shaft 11 for that purpose, the ends of the aforementioned loop being extended laterally away from the shaft 11 and finally being brought together and bent into the form of a spring seat 24. A compression spring 25 is seated between the spring seat 24 at the outer end of lever 23 and a suitable spring seat 26, which is formed by stamping or otherwise provided on the rear face of the housing of tuner 13. The end of cam follower 22 on the opposite side of pivot 21 from the follower surface 19*a* is modified as at 22*a* to press against the spring-seat portion 24 of the lever 23. This construction results in spring 25 being normally compressed to a greater or lesser degree depending on the position of cam 19 and hence on the position of follower 22**.

That loop of spring wire which forms a part of lever 23 functions as a friction clutch on the shaft 11. Translational movement of the lever 23 will produce corresponding rotation of the shaft 11, since the frictional grip of the lever 23 on the shaft 11 is greater than the friction developed in the bearings by which the shaft 11 is carried in the U. H. F. tuner 13.

As a result, rotation of the shaft 11 through a limited arc may be accomplished by manual rotation of the knob 18. The manner in which this is accomplished is as follows: Rotation of knob 18 results in rotation of shaft 15 and hence in rotation of cam 19. Movement of cam 19 causes follower 22 to rock on pivot 21, resulting in expansion or contraction of the spring 25 and in corresponding translational movement of the lever 23. This produces equivalent movement of shaft 11, although at a very much slower rate than would equivalent manual rotational motion applied to knob 12. Hence it is possible, by adjustment of knob 18, to achieve excellent and accurate fine tuning action of both the V. H. F. and the U. H. F. tuners.

The fine-tuning mechanism just described does not interfere with manual rotation of knob 12 for purposes of coarse tuning of the V. H. F. tuner 13, since the spring-wire loop **23*a* slips in its groove on shaft 11 whenever shaft 11** is rotated manually.

The cam 19 is shown in Figs. 1–3 as a conventional circular cam eccentrically mounted on the shaft 15. Such a cam will provide effective fine tuning through 180° rotation of knob 15. It will of course be understood that cams of other conformations may be employed to produce even slower relative movement of the shaft 11 with rotation of the knob 15. Thus, for example, an alternative cam is shown in Fig. 4 and marked 119, which is designed for cooperation with a modified type of cam follower 121, having a pin designed to bear against the cam surface. Cam 119 will yield fine tuning of shaft 11 over a range of 540° rotation of knob 18.

In most cases, the cam employed in my fine-tuning mechanism will be so designed as to provide similar fine-tuning behavior for the V. H. F. and U. H. F. ranges. That is, if the design of the V. H. F. tuner is such that a cycle of fine tuning requires 180° rotation of shaft 15, then a cam providing a 180° cycle of fine tuning will ordinarily be used for the U. H. F. mechanism.

It will be understood that my description of the invention in connection with a tandem U. H. F. and V. H. F. tuner assembly is merely illustrative. Obviously, my mechanism may, if desired, be used on many other types of apparatus and combinations of elements. Similarly, the structural details shown may be varied extensively by persons skilled in the art without departing from the principles and spirit of my invention.

I claim:

1. In combination with a rotary shaft, a second shaft rotatably mounted coaxially with said first shaft, manual means for rotating said second shaft, an arm slippably clutched to said first shaft and extending away laterally therefrom, a cam rigidly joined to said second shaft for rotation therewith, a cam follower pivotally mounted adjacent said cam, one part of said follower being positioned to bear on said cam and another part of said follower being positioned to bear against said arm, and resilient means urging said arm against said cam follower, rotation of said second shaft and said cam being operative through said follower to rock said arm and thereby to rotate said first shaft through a limited arc, the torque required to rotate said first shaft being less than the torque transmitted to said shaft by said slippably clutched arm.

2. In combination with a rotary shaft, a second shaft rotatably mounted coaxially with said first shaft, manual means for rotating said second shaft, an arm slippably clutched to said first shaft and extending away laterally therefrom, a cam rigidly joined to said second shaft for rotation therewith, a cam follower pivotally mounted adjacent said cam, one part of said follower being positioned to bear on said cam and another part of said follower being positioned to bear against said arm, and resilient means urging said arm against said cam follower, rotation of said second shaft and said cam being operative through said follower to rock said arm and thereby to rotate said first shaft through a limited arc, the torque required to rotate said first shaft being less than the torque transmitted to said shaft by said slippably clutched arm, said first shaft being directly rotatable independently of said arm when subjected to torque sufficient to cause slippage of said arm thereon.

3. In combination with a rotary shaft, a second shaft rotatably mounted coaxially with said first shaft, manual means for rotating said second shaft, a cam rigidly joined to said second shaft for rotation therewith, an arm of resilient material snugly gripped around said first shaft to provide a slippable frictional clutch therewith, said arm extending laterally away from said first shaft, and a pivotally mounted cam follower extending between said cam and said arm, operative on rotation of said second shaft and said cam to impart a rocking movement to said arm and thereby to rotate said first shaft through a limited arc by torque transmitted through said slippable clutch, said first shaft being directly rotatable independently of said arm when subjected to torque sufficient to cause slippage of said friction clutch.

4. In combination with a rotary shaft, a second shaft rotatably mounted coaxially with said first shaft, manual means for rotating said second shaft, a cam ragidly joined to said second shaft for rotation therewith, said first shaft having an annular groove in its surface, the plane of said groove being perpendicular to the axis of said shaft, an arm carried by said first shaft and extending laterally away therefrom, said arm comprising a clutching portion formed of resilient material and seated in said groove, and a cam follower pivotally mounted near said shafts and defining a mechanical linkage between said cam and said arm, rotation of said second shaft and said cam being operative through said follower to rock said arm and to rotate said first shaft through a limited arc by torque transmitted thereto via said clutching portion and said groove.

5. In tuner mechanism for wave-signal receiving apparatus, having a first section adapted to tune over a first frequency range, a second section adapted to tune over a second frequency range, and three coaxially mounted shafts, the innermost of said shafts being operative on rotation to effect coarse tuning of said first section, the intermediate one of said shafts being operative on rotation to effect fine tuning of said first section, and the outermost of said shafts being operative on rotation to effect tuning of said second section, means for causing rotation of said intermediate shaft to also effect fine tuning of said second section, comprising a cam rigidly secured to said intermediate shaft, a laterally extending arm frictionally clutched to said outer shaft, a pivotally mounted cam follower mechanically linking said cam and said arm, and resilient means urging said follower to bear against said cam, rotation of said intermediate shaft and cam being operative through said follower to rock said arm and to rotate said outer shaft through a limited arc, said arm being slippable on said outer shaft to permit direct rotation thereof when sufficient torque is applied thereto.

6. In tuning mechanism for a wave-signal receiver having a first section adapted to tune over a first frequency range, a second section adapted to tune over a second frequency range, and three coaxially mounted shafts, including a first shaft operative on rotation to effect coarse tuning of said first section, a second shaft operative on rotation to effect fine tuning of said first section, and a third shaft operative on rotation to tune said second section, means for causing rotation of said second shaft to also effect fine tuning of said second section, comprising a cam rigidly secured to said second shaft for rotation therewith, an arm frictionally clutched to said third shaft and extending laterally away therefrom, and a pivoted cam follower mechanically linking said cam and said arm, rotation of said second shaft and said cam being operative to rock said arm and thereby to rotate said third shaft through a limited arc responsively to torque transmitted to said third shaft via said frictionally clutched arm.

7. The apparatus of claim 6 wherein said third shaft is provided with an annular groove for receiving said arm, said arm having a resilient gripping portion seated in said groove.

No references cited.